United States Patent
Tier et al.

(10) Patent No.: US 10,752,186 B2
(45) Date of Patent: Aug. 25, 2020

(54) QUARTER PANEL ASSEMBLIES INCLUDING SERVICE HOLE COVERS WITH NOISE REDUCTION FLANGES

(71) Applicant: Toyota Motor Engineering & Manufacturing North America, Inc., Plano, TX (US)

(72) Inventors: Matthew C. Tier, South Lyon, MI (US); Koh Mizutani, Ann Arbor, MI (US); Marc Siciliano, Ann Arbor, MI (US); Jason T. Huang, Ann Arbor, MI (US); Michael Camilleri, Ypsilanti, MI (US); Robert Porcs, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 115 days.

(21) Appl. No.: 16/198,159

(22) Filed: Nov. 21, 2018

(65) Prior Publication Data

US 2020/0156564 A1    May 21, 2020

(51) Int. Cl.
*B60R 13/08*  (2006.01)
*B62D 25/02*  (2006.01)
*B60H 1/26*   (2006.01)
*B60H 1/00*   (2006.01)

(52) U.S. Cl.
CPC .......... *B60R 13/0815* (2013.01); *B60H 1/26* (2013.01); *B62D 25/02* (2013.01); *B60H 2001/006* (2013.01)

(58) Field of Classification Search
CPC .............. B60R 13/0815; B60H 1/26; B60H 2001/006; B62D 25/02
USPC ......................................................... 296/191
See application file for complete search history.

(56) References Cited

U.S. PATENT DOCUMENTS

| 6,866,576 B2 | 3/2005 | Quinn et al. |
| 2005/0075064 A1 | 4/2005 | Omiya et al. |
| 2014/0323027 A1* | 10/2014 | Ide ........................ F04D 29/281 |
| | | 454/119 |

FOREIGN PATENT DOCUMENTS

| CN | 104842892 | 8/2015 |
| JP | 3791378 | 6/2006 |
| JP | 2006213151 | 8/2006 |
| JP | 2017202727 | 11/2017 |

* cited by examiner

*Primary Examiner* — Pinel E Romain
(74) *Attorney, Agent, or Firm* — Dinsmore & Shohl LLP

(57) ABSTRACT

A vehicle includes a vehicle body including a quarter panel assembly. The quarter panel assembly includes an inner quarter panel and an outer quarter panel located outboard of the inner quarter panel forming a volume therebetween. The outer quarter panel has a vent opening extending therethrough. A quarter vent assembly is connected to the outer quarter panel covering the vent opening. An exterior fascia covers the quarter vent assembly such that an air gap is provided between the quarter vent assembly and the exterior fascia. A service hole cover is located in the volume between the inner quarter panel and the outer quarter panel. The service hole cover includes a cover body and a noise reduction flange at a bottom of the cover body that extends inboard toward the inner quarter panel at the vent opening.

20 Claims, 8 Drawing Sheets

US 10,752,186 B2

QUARTER PANEL ASSEMBLIES INCLUDING SERVICE HOLE COVERS WITH NOISE REDUCTION FLANGES

TECHNICAL FIELD

The present specification generally relates to quarter panel assemblies and, more specifically, vehicles including quarter panel assemblies including service hole covers with noise reduction flanges.

BACKGROUND

Some current vehicles include quarter vent assemblies located at rear quarter panel assemblies. The quarter vent assemblies are used for venting air from inside of the vehicle, for example, when a door is closed and also to improve air conditioner performance. While the quarter vent assemblies may be effective for air exchange between the interior of the vehicle and the surrounding environment, the quarter vent assemblies can also provide an entryway for road noise to leak into the interior of the vehicle, which can increase noise within the vehicle compared to if the quarter vent assemblies were not present.

Accordingly, a need exists for quarter panel assemblies that include noise reduction features.

SUMMARY

In one embodiment, a vehicle includes a vehicle body including a quarter panel assembly. The quarter panel assembly includes an inner quarter panel and an outer quarter panel located outboard of the inner quarter panel forming a volume therebetween. The outer quarter panel has a vent opening extending therethrough. A quarter vent assembly is connected to the outer quarter panel covering the vent opening. An exterior fascia covers the quarter vent assembly such that an air gap is provided between the quarter vent assembly and the exterior fascia. A service hole cover is located in the volume between the inner quarter panel and the outer quarter panel. The service hole cover includes a cover body and a noise reduction flange at a bottom of the cover body that extends inboard toward the inner quarter panel at the vent opening.

In another embodiment, a method of reducing noise entering a cabin of a vehicle through a quarter vent assembly is provided. The method includes placing a service hole cover within a volume between an inner quarter panel and an outer quarter panel. The service hole cover includes a cover body and a noise reduction flange at a bottom of the cover body that extends inboard toward the inner quarter panel. The service hole cover is arranged such that the noise reduction flange is located at the quarter vent assembly.

In another embodiment, a service hole cover is sized to be located in a volume between an inner quarter panel and an outer quarter panel. The service hole cover includes a cover body and a noise reduction flange at a bottom of the cover body that extends inboard beyond a thickness of the cover body to a free end.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to quarter panel assemblies for vehicles with quarter vent assemblies. The quarter panel assemblies may include an inner quarter panel, an outer quarter panel, an exterior fascia and a service hole cover that is located between the inner quarter panel and the outer quarter panel. The service hole cover generally extends in a vehicle lateral direction between rearward pillars, such as between a C-pillar and a D-pillar of a van or SUV. The service hole cover generally extends in a vehicle vertical direction between a rear window frame and a quarter vent assembly located near a floor of the vehicle. The quarter vent assembly includes an opening that is formed through the outer quarter panel that allows for air exchange between the environment and interior of the vehicle. This opening can also provide a pathway for noise to travel from outside to inside the vehicle toward the cabin. To reduce this noise, the service hole cover is provided with a noise reduction flange located above the opening that extends into a space between the outer quarter panel and the inner quarter panel thereby providing a more tortious path for sound to travel through this space toward the cabin.

Figure 1:
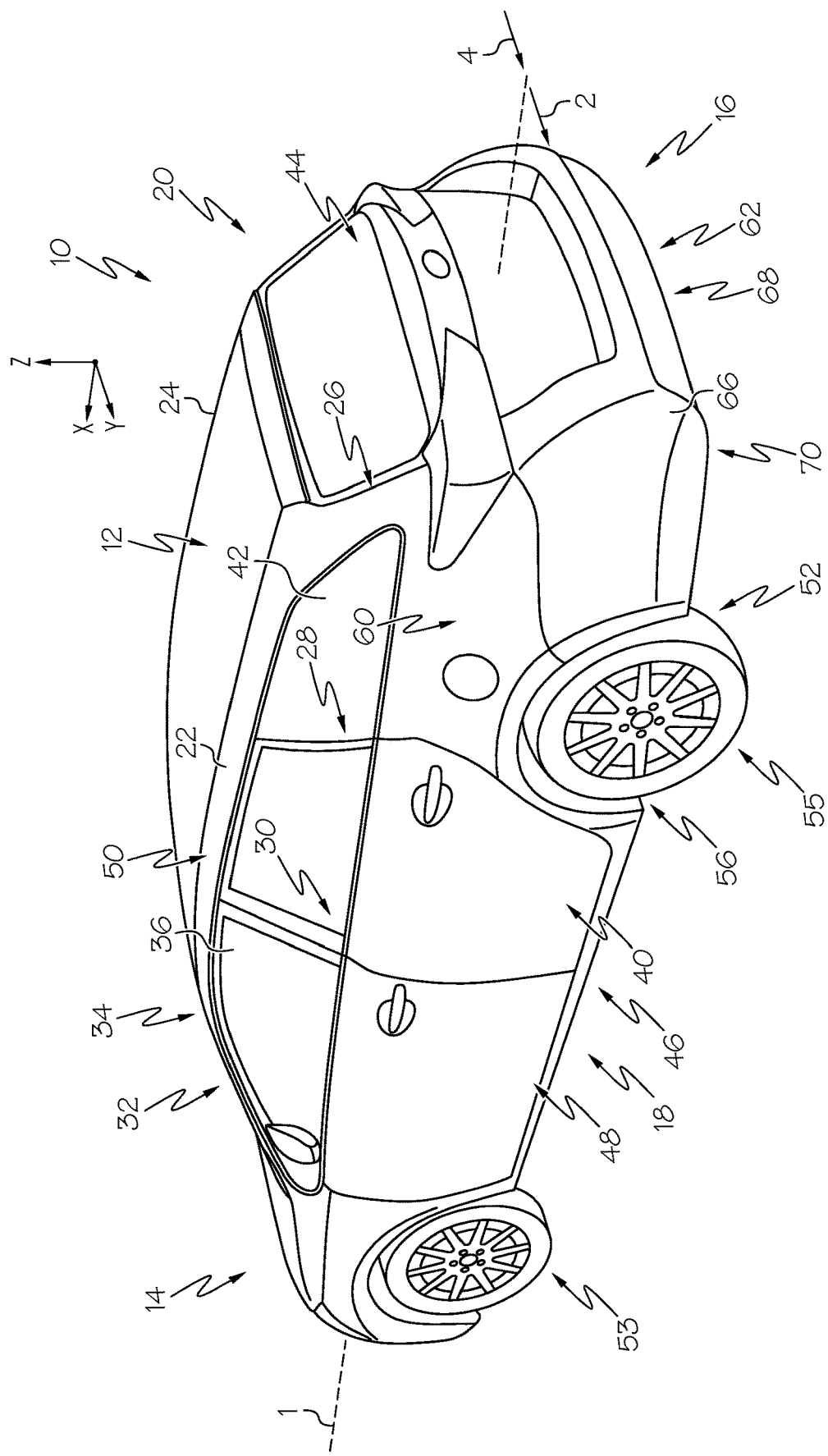
FIG. 1 is a perspective view of a vehicle including a quarter panel assembly, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein.

In FIG. 1, selected portions of the vehicle 10 are illustrated. In the illustrated example, the vehicle 10 is a minivan; however, the quarter panel assemblies described herein may be used with other types of vehicles, such as SUV, hatchbacks, etc. The vehicle 10 generally includes a vehicle body 12 having a front 14, a rear 16 and sides 18, 20 that extend between the front 14 and the rear 16. The vehicle body 12 includes a pair of side roof rail structures 22 and 24 and various pillar assemblies. The various pillar assemblies are connected to the side roof rail structures 22 and 24 and extend downwardly therefrom in a vehicle vertical direction. These pillar assemblies are generally referred to as a D-pillar assembly 26, a C-pillar assembly 28, B-pillar assembly 30 and an A-pillar assembly 32. The A-pillar assemblies 32 are located toward the front 14 of the vehicle 10, generally between a front windshield 34 and front side windows 36. The B-pillar assemblies 30 are located generally between the front side windows 36 and door 40 of the vehicle 10. The C-pillar assemblies 28 are located between the door 40 and rear side window 42 of the vehicle 10. The D-pillar assemblies 26 are located between the rear side window 42 and a rear door 44.

The vehicle body 12 can include a pair of rocker assemblies 46 that extend in the vehicle longitudinal direction, and are generally parallel to side members of the vehicle body 12. The pair of rocker assemblies 46 may be positioned outboard from the side members of the vehicle body 12. The rocker assemblies 46 may be positioned proximate to a lower portion of a door opening 48 of a cabin 50, and between front wheels 53 and rear wheels 55. The rocker assemblies 46 may also be positioned proximate to a floor of the cabin 50.

The vehicle body 12 includes the A-pillar assemblies 32. The A-pillar assemblies 32 may extend generally upward in the vertical direction from the pair of rocker assemblies 46 to support the side roof rail structures 22 and 24. The vehicle body 12 may further include the D-rear pillar assemblies 26 and C-pillar assemblies 28 and B-pillar assemblies 30, as discussed above. The A-pillar assemblies 32, B-pillar assemblies 30, C-pillar assemblies 28, and D-pillar assemblies 26 may each be coupled to the rocker assemblies 46 of the vehicle body 12.

A pair of wheel well portions 52 are positioned rearward of the rocker assemblies 46. The wheel well portions 52 may extend in an outboard direction to a position generally proximate to the rocker assemblies 46 in the vehicle lateral direction. The wheel well portions 52 may be formed integrally with the D-pillar assemblies 26 or, alternatively, may be coupled to the D-pillar assemblies 26. Rear wheels 55 may be generally positioned at least partially within the wheel well portions 52 and rearward of the rocker assemblies 46 in the vehicle longitudinal direction. The wheel well portions 52 may accommodate portions of a rear suspension unit 56.

The wheel well portions 52 may be formed, at least in part, by rear quarter panel assemblies 60. The rear quarter panel assemblies 60 may have concave portions that face away from the cabin 50 of the vehicle body 12. The rear quarter panel assemblies 60 may be shaped to generally accommodate the rear wheel 55 of the rear suspension unit 56.

Figure 2:
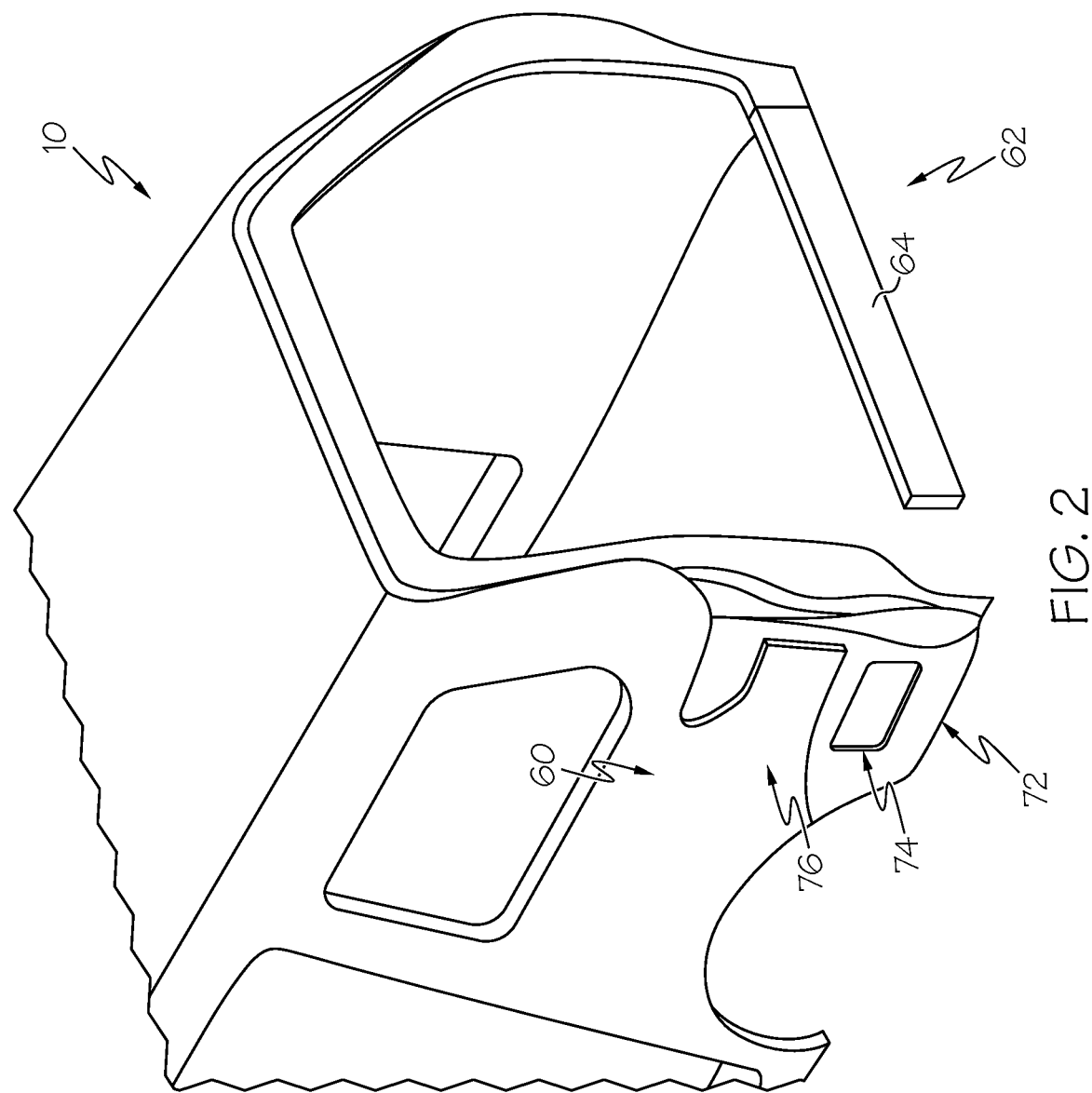
FIG. 2 is a perspective rear view of the vehicle body of FIG. 1, according to one or more embodiments shown and described herein.

Referring also to FIG. 2, a rear bumper assembly 62 extends between the rear quarter panel assemblies 60 in the vehicle lateral direction. The rear bumper assembly 62 includes a rear bumper reinforcement beam 64 (FIG. 2) and a rear bumper cover 66 (FIG. 1) that covers the rear bumper reinforcement beam 64. As can be seen by FIG. 1, the rear bumper cover 66 has a central portion 68 that covers the rear bumper reinforcement beam 64 and side portions 70 that form part of the rear quarter panel assemblies 60. At least one of the side portions 70 covers a quarter vent assembly 72 so that the quarter vent assembly 72 is hidden from view. Only a vent opening 74 of the quarter vent assembly 72 can be seen in FIG. 2. The vent opening 74 is formed through an outer quarter panel 76 that is part of the rear quarter panel assembly 60.

Figure 3:
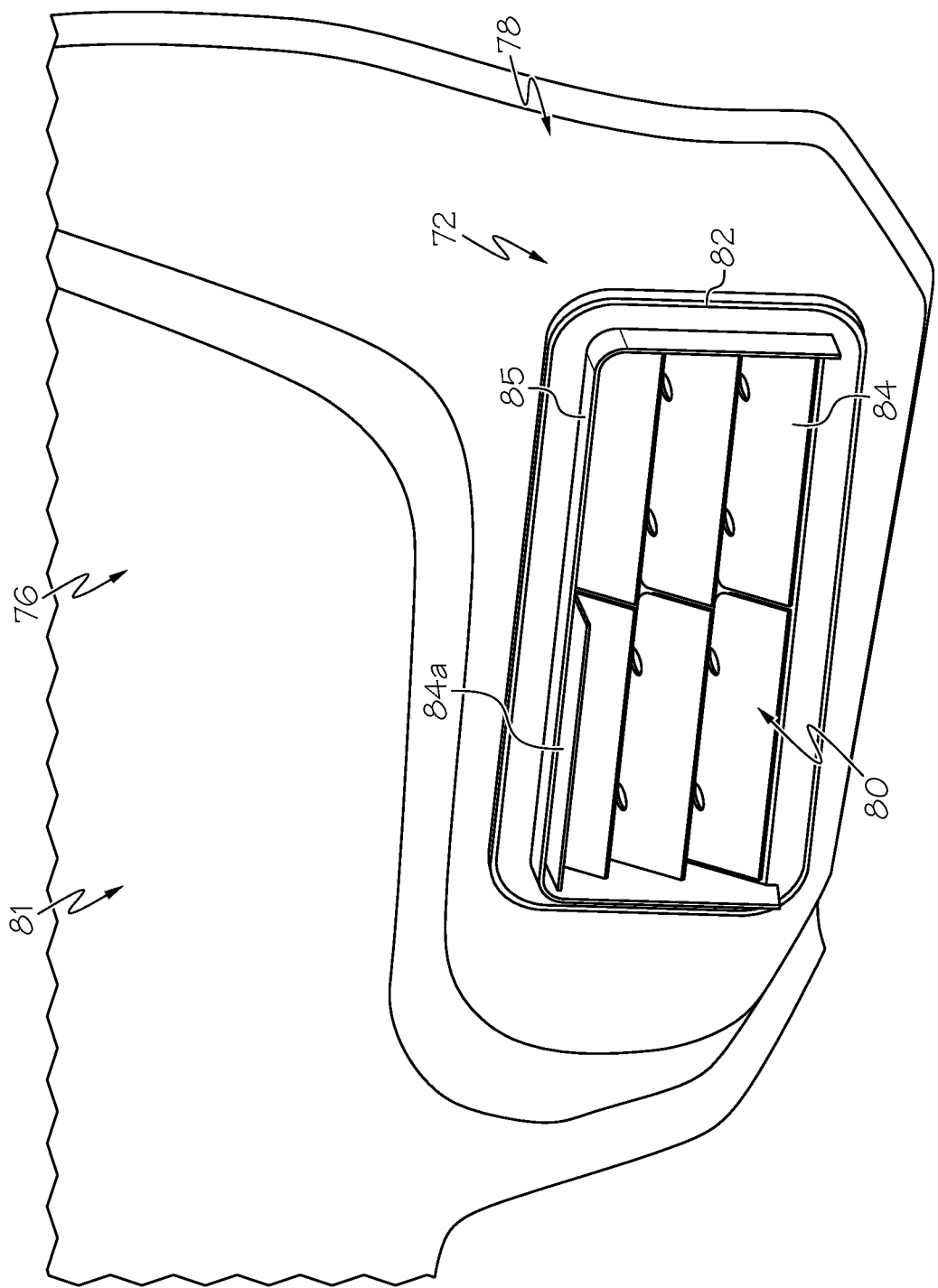
FIG. 3 is a detail view of the vehicle body of FIG. 2 including a quarter vent assembly, according to one or more embodiments shown and described herein.

Referring to FIG. 3, the quarter vent assembly 72 is illustrated in greater detail connected to the outer quarter panel 76. The quarter vent assembly 72 is connected to the outer quarter panel 76 within a recessed portion 78 that is recessed relative to an outer portion 81 that provides an air gap between the quarter vent assembly 72 and the rear bumper cover 66 (FIG. 1). The quarter vent assembly 72 includes an air louver assembly 80 that includes a connector frame 82 and a number of individually mounted flaps 84. The flaps 84 may be rotatably mounted to the connector frame 82 so as to be rotatable about an axis of rotation. For example, flap 84a is illustrated in both a lowered and raised configuration. The connector frame 82 may include a hood 85 that extends about only a portion of the air louver assembly 80 in order to inhibit air from flowing by the flaps 84 and help direct air toward the flaps 84 in operation.

Figure 4:
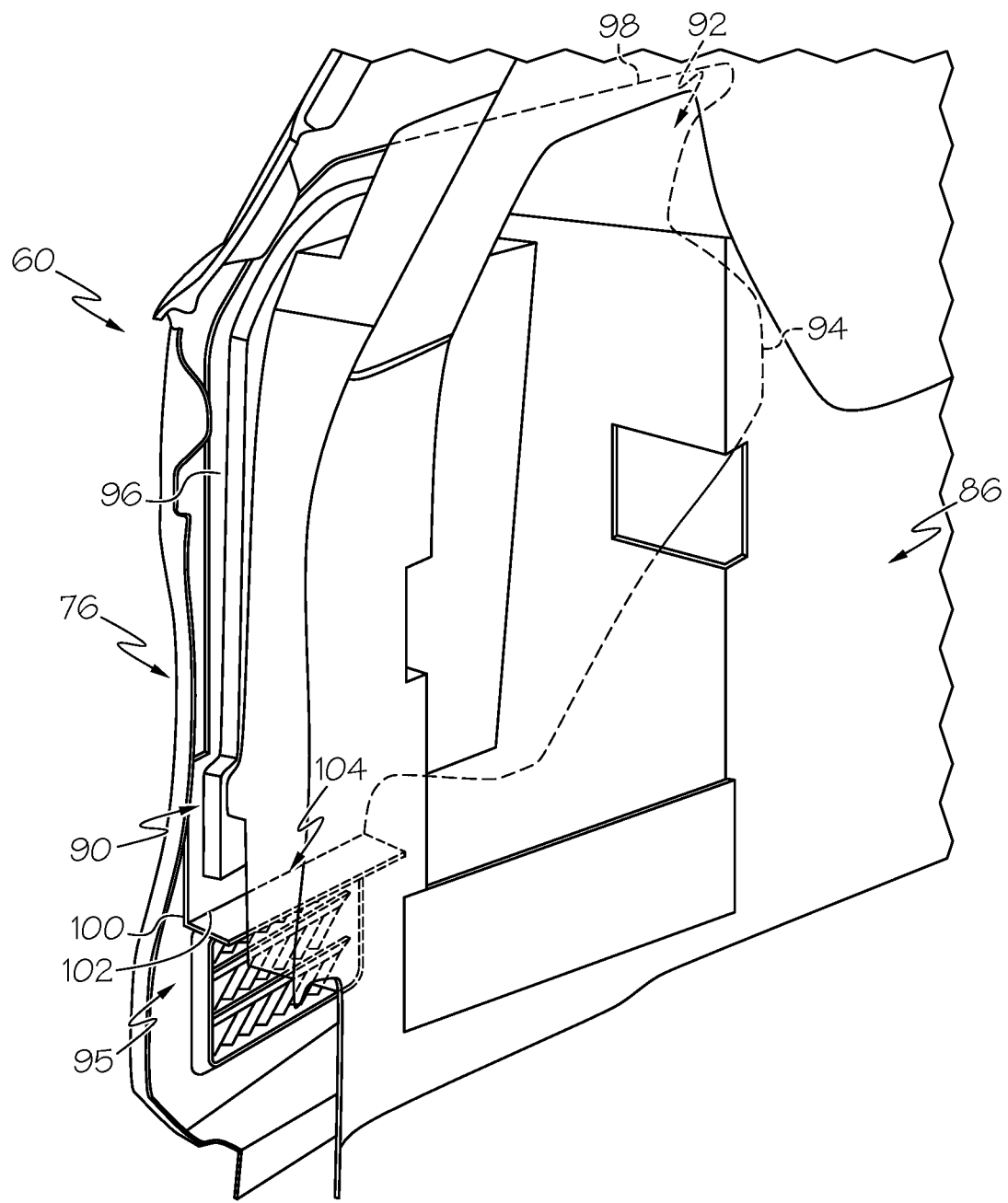
FIG. 4 is an interior perspective view of the quarter panel assembly of FIG. 1, according to one or more embodiments shown and described herein.

FIG. 4 illustrates an interior view of the rear quarter panel assembly 60. The rear quarter panel assembly 60 further includes an inner quarter panel 86, the outer quarter panel 76 and a service hole cover 90 that is located between the inner quarter panel 86 and the outer quarter panel 76. The inner quarter panel 86 may be a trim panel formed of, for example, a plastic material or combination of materials, while the outer quarter panel 76 may be formed of a metal. The service hole cover 90 is located in a volume 95 provided between the inner quarter panel 86 and the outer quarter panel 76.

The service hole cover 90 (shown in part by dashed lines) includes a cover body 92 that extends generally between the C-pillar assembly 28 and the D-pillar assembly 26 in the vehicle lateral direction and between the rear side window 42 and the rocker assembly 46 (FIG. 1). The service hole cover 90 may be formed of any suitable material, such as a plastic and/or foam. The material for the service hole cover 90 may be selected to provide some sound damping during operation.

Figure 5:
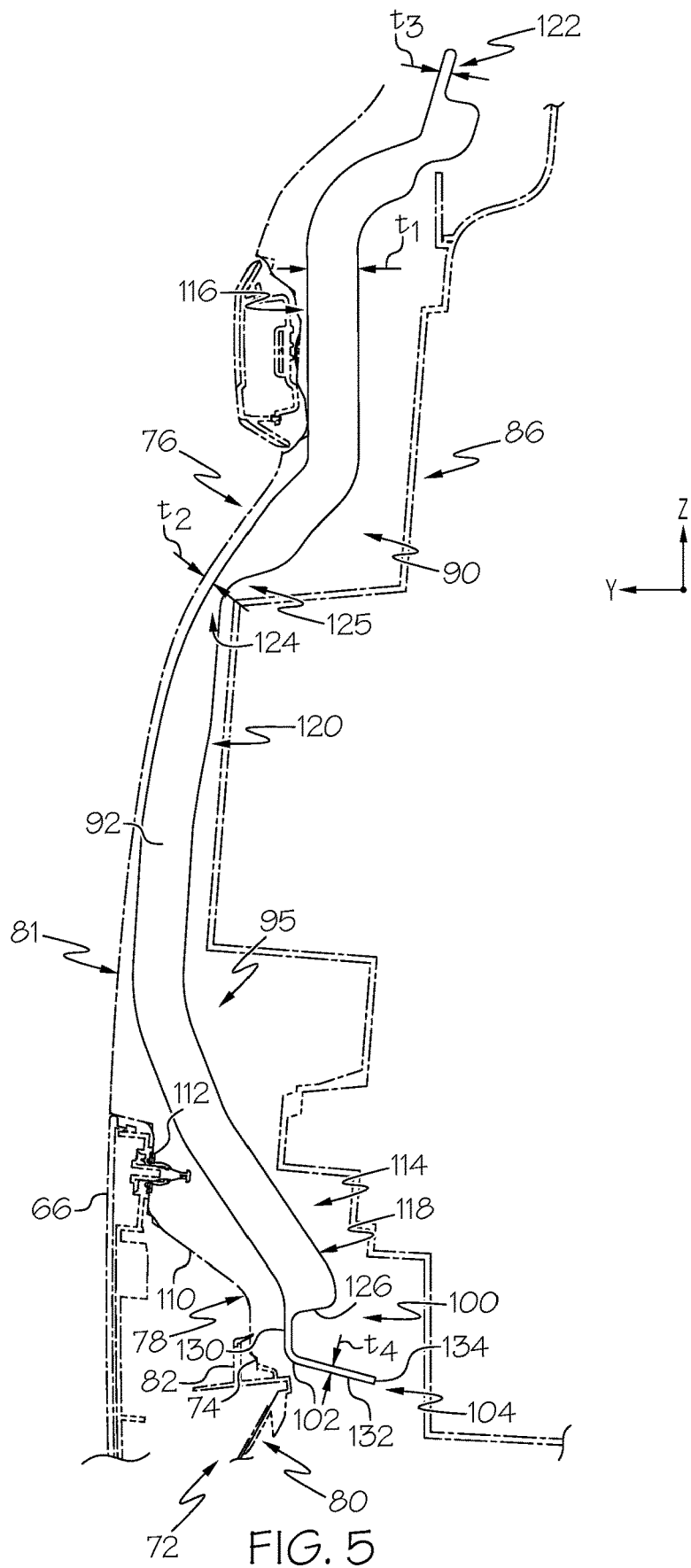
FIG. 5 is a section view of the quarter panel assembly of FIG. 4, according to one or more embodiments shown and described herein.

While the service hole cover 90 may be any shape suitable for the shape and size of the volume 95, in this embodiment, the cover body 92 includes a front side 94, a rear side 96, a top 98 and a bottom 100. As can be seen, the cover body 92 may somewhat taper in the vehicle longitudinal direction from the top 98 toward the bottom 100. The service hole cover 90 covers an area that is at least twice an area of the vent opening 74, such as at least about 3 times larger, such as at least about 4 times larger, such as at least about 5 times larger. Referring also to FIG. 5, the service hole cover 90 may terminate at the bottom 100 at a location at least partially above the quarter vent assembly 72. In particular, a corner 102 is provided where a noise reduction flange 104 extends outwardly from the cover body 92 in the vehicle lateral direction toward the inner quarter panel 86. As can be seen, the noise reduction flange 104 may have a length that is the same or greater than a length of the vent opening 74 in the vehicle longitudinal direction. However, the length of the noise reduction flange 104 may be less (e.g., no more than about half) than a maximum length of the cover body 92.

Referring to FIG. 5, the inner quarter panel 86 is shown spaced-from the outer quarter panel 76 providing the volume 95 therebetween. The service hole cover 90 is illustrated positioned between the inner quarter panel 86 and the outer quarter panel 76 and within the volume 95. The outer quarter panel 76 includes the outer portion 81 and the recessed portion 78 that are connected by a recess sidewall 110. The recess sidewall 110 has a ledge portion 112 that is relatively flat in the vehicle vertical and longitudinal directions to which the rear bumper cover 66 may be connected (e.g., fastened) to the outer quarter panel 76. As can be seen, the recessed portion 78 provides the air gap 114 between the quarter vent assembly 72 and the rear bumper cover 66 that allows outside air to enter and exit the quarter vent assembly 72.

The cover body 92 of the service hole cover 90 may be somewhat flexible and compressible in order to accommodate and fit within the volume 95 between the inner quarter panel 86 and the outer quarter panel 76. As can be seen, either or both of the inner quarter panel 86 and the outer quarter panel 76 may have cross-sectional shapes that are somewhat irregular and depend, at least in part on styling and package constraints of the particular vehicle 10. To this end, the cover body 92 may be formed (e.g., molded) in a particular cross-sectional shape and dimensioned to fit within the volume 95. In some embodiments, it may be desirable to maintain some spacing between the service hole cover 90 and the inner and outer quarter panels 86, 76.

In the particular embodiment of FIG. 5, the cover body 92 includes an upper portion 116, a lower portion 118 and an intermediate portion 120 that is located between the upper portion 116 and the lower portion 118. The upper portion 116 includes an upper flange 122 that extends outwardly from the cover body 92 in a generally vehicle vertical direction. The upper flange 122 may be used in mounting (e.g., fastening) the service hole cover 90 within the rear quarter panel assembly 60. The cover body 92 has a maximum thickness $t_1$ within the upper portion 116, lower portion 118 and intermediate portion 120. The maximum thickness $t_1$ may be, for example, between about 5 mm and about 30 mm. The cover body 92 may also have a minimum thickness $t_2$ within the upper portion 116, lower portion 118 and intermediate portion 120. The minimum thickness $t_2$ may be, for example, between about 3 mm and about 10 mm. The upper flange 122 may have a maximum thickness $t_3$ that is less than the maximum thickness $t_1$ (and the minimum thickness $t_2$), such as about 0.5 $t_1$ or less, such as about 0.25$t_1$ or less, such as 0.15$t_1$ or less.

The intermediate portion 120 may include a necked-down region 124 of minimum thickness $t_2$, for example, to maintain a minimum spacing 125 (e.g., about 10 mm or less, such as about 5 mm or less) between the cover body 92 and the inner quarter panel 86 at any of the upper portion 116, lower portion 118 and intermediate portion 120. The lower portion 118 extends downward from the intermediate portion 120 and terminates at an end 126. In some embodiments, the end 126 is located above the connector frame 82. In other embodiments, the end 126 may be at or below the connector frame 82. In some embodiments, the end 126 may be located behind the air louver assembly 80. In the illustrated embodiment, the end 126 is located above the connector frame 82 and directly inboard of the recessed portion 78 of the outer quarter panel 76.

The service hole cover 90 includes the noise reduction flange 104 that extends both downward and inboard from the end 126 of the cover body 92. The noise reduction flange 104 has a connected portion 130 that extends outward from the end 126 in the vehicle vertical direction and a free portion 132 that extends outward from the connected portion 130 in the vehicle lateral direction to a free end 134. As can be seen, the free portion 132 may terminate at a location outboard of the inner quarter panel 86 and hang freely at end 134 within the volume 95. The noise reduction flange 104 may have a maximum thickness $t_4$ that is less than the maximum thickness $t_1$ (and the minimum thickness $t_2$), such as about 0.5 $t_1$ or less, such as about 0.25$t_1$ or less, such as 0.15$t_1$ or less.

At least a portion of the free portion 132 may be located above the air louver assembly 80 in order to inhibit the passage of noise thereby providing a more tortuous path for the noise through the volume 95. In the illustrated example, the corner 102 is located directly inboard of the connector frame 82. In some embodiments, the corner 102 (and free end 134) is located at the vent opening, which may be no more than about 10 mm above the vent opening 74, such as no more than about 7 mm, such as no more than about 5 mm, such as no more than about 2 mm, such as between about 2 mm and about 10 mm above the vent opening 74. Further, the free portion 132 may extend inboard at an angle to horizontal, such as between about 1 and 45 degrees from horizontal and may extend outwardly beyond the cover body 92 in the vehicle lateral direction.

Figure 6:
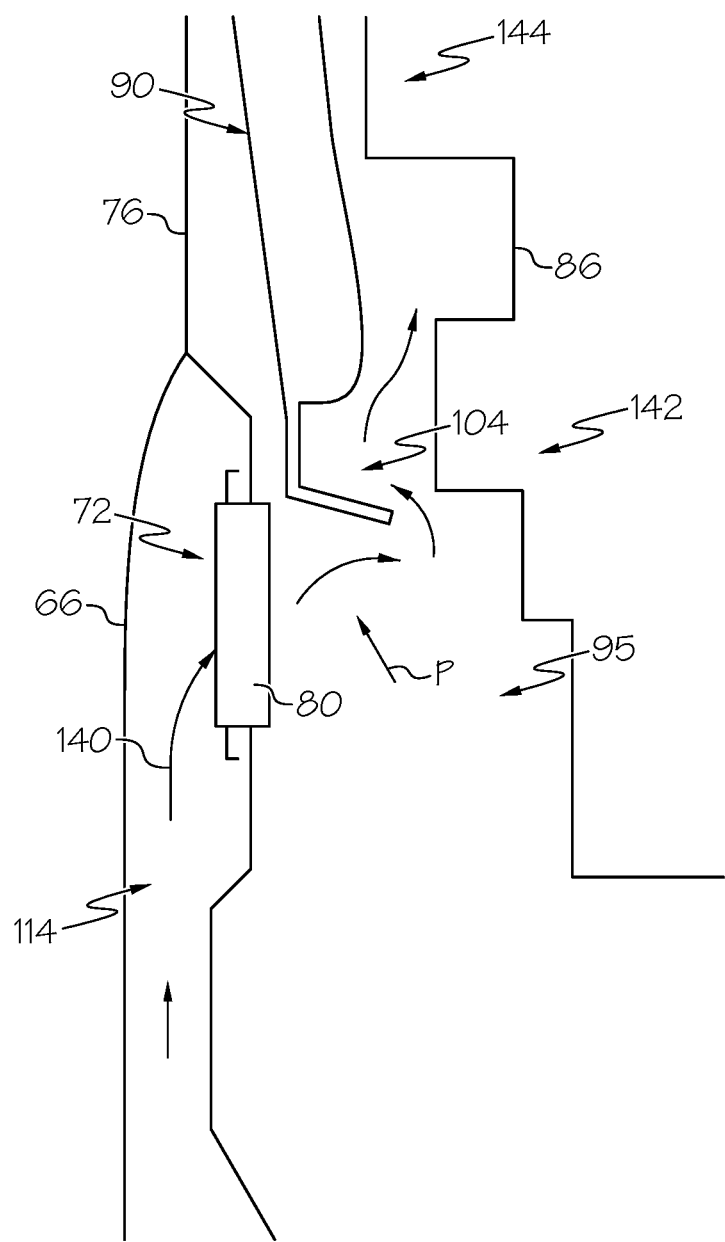
FIG. 6 is a diagrammatic section view of the quarter panel assembly of FIG. 5 illustrating operation, according to one or more embodiments shown and described herein.

FIG. 6 schematically illustrates operation of the service hole cover 90. During operation, such as when driving the vehicle, air and noise (represented by arrows 140 for illustration) enter the gap 114 between the quarter vent assembly 72 and the rear bumper cover 66. The noise 140 travels toward the quarter vent assembly 72 and passes through the air louver assembly 80. While the air louver assembly may dissipate and/or redirect some of the noise 140, some of the noise passes through air louver assembly 80 and into the volume 95. At least some of the noise 140 may pass along a path P that leads toward the cabin 50 of the vehicle 10. Placement of the noise reduction flange 104 makes the path P more tortuous than without presence of the noise reduction flange 104. Providing a more tortuous path can provide more opportunity to redirect and/or absorb the noise 140. As explained above, in some embodiments, the service hole cover may be formed and include a material that can absorb sound.

As can also be seen by FIG. 6, the inner quarter panel 86 may not be flat or planar along the path. In the example of FIG. 6, the inner quarter panel 86 includes projecting regions 142 and 144 that project toward the path P. In this way, the projecting regions 142 and 144 of the inner quarter panel 86 may also contribute to providing a more tortuous path P for the noise 140.

In the embodiments of FIGS. 5 and 6, the noise reduction flange 104 is formed as a monolithic part (i.e., from a single piece of material) of the service hole cover and the projecting regions 142 and 144 are formed as monolithic parts of the inner quarter panel 86. In other embodiments, the noise reduction flange 104 may be formed separately from the cover body 92 and then attached thereto and the projecting regions 142 and 144 may be formed separately from the inner quarter panel 86 and then attached thereto.

Figure 7:
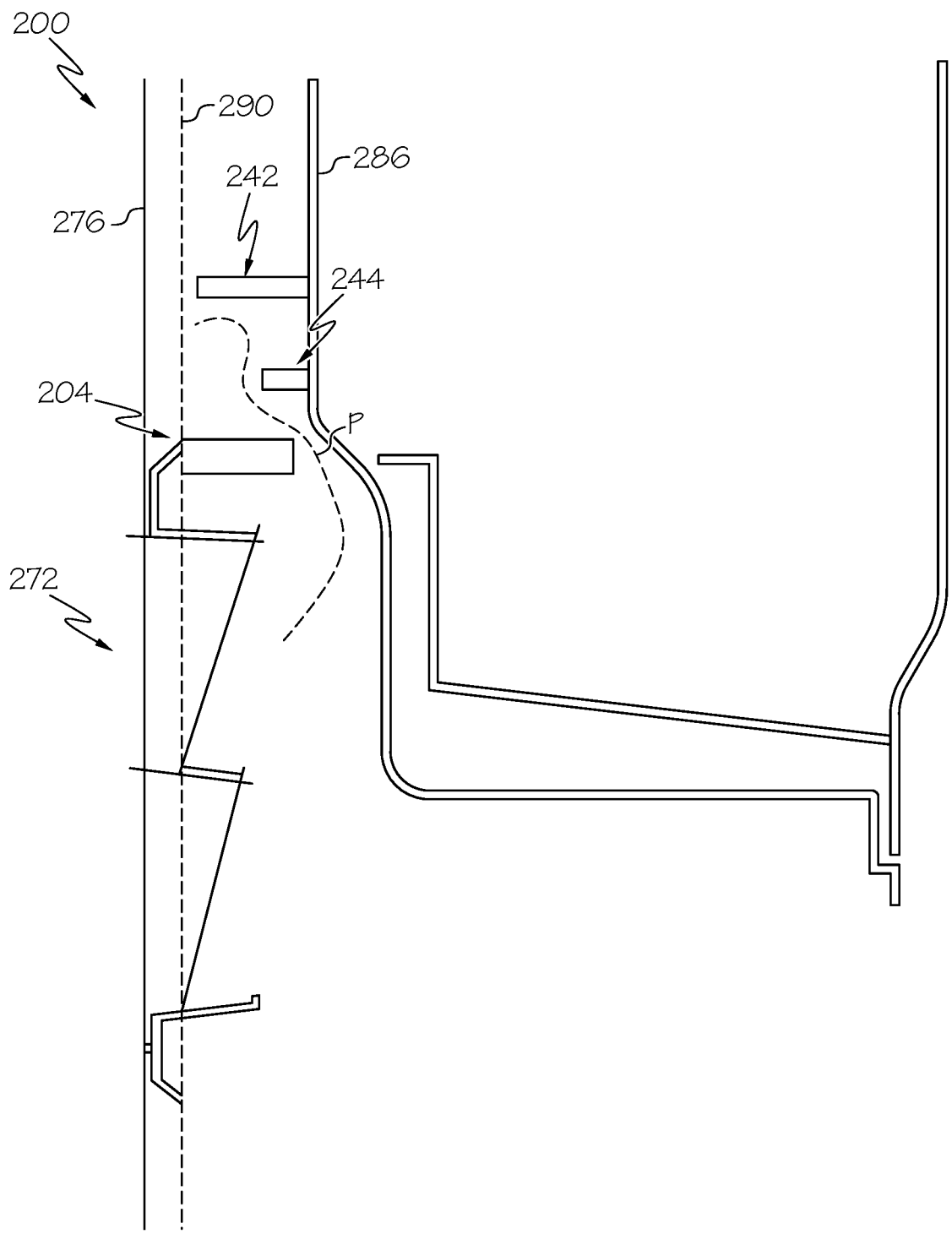
FIG. 7 is a diagrammatic section view of another embodiment of a quarter panel assembly, according to one or more embodiments shown and described herein.

Referring to FIG. 7, for example, a rear quarter panel assembly 200 similar to that of FIG. 6 is shown that includes a quarter vent assembly 272, a service hole cover (represented by dotted line 290), an outer quarter panel 276 and an inner quarter panel 286. In this embodiment, a noise reduction flange 204 is formed separately from the service hole cover 290 and is attached thereto. Similarly, projecting regions 242 and 244 are formed as projections that are formed separately from the inner quarter panel 286 and then attached thereto. The noise reduction flange 204 and projecting regions 242 and 244 form the tortuous path P. As can be seen in the embodiments of FIGS. 5-7, the projecting regions of the inner quarter panels are located above the noise reduction flanges; however, other arrangements are possible.

Figure 8:
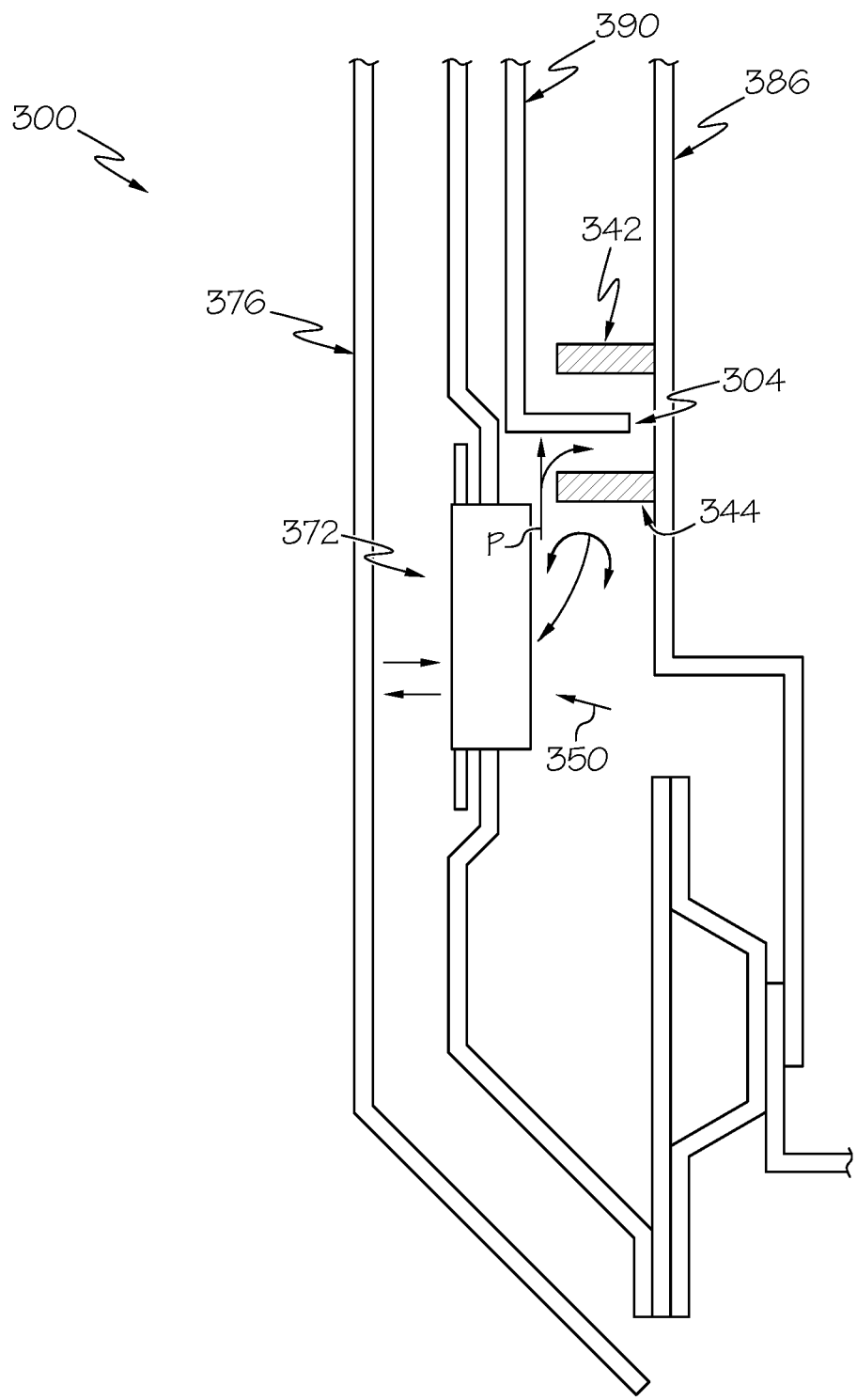
FIG. 8 is a diagrammatic section view of another embodiment of a quarter panel assembly, according to one or more embodiments shown and described herein.

Referring to FIG. 8, an embodiment of a rear quarter panel assembly 300 is illustrated that includes a quarter vent assembly 372, a service hole cover 390, an outer quarter panel 376 and an inner quarter panel 386. In this embodiment, a noise reduction flange 304 is located between projecting regions 342 and 344 of the inner quarter panel 386 forming the tortuous path P. FIG. 8 also illustrates exhaust air (represented by arrow 350) exiting the cabin and heading toward the quarter vent assembly 372, for example, due to a rear door closing or other event.

The above-described rear quarter panel assemblies provide a service hole cover that includes an integrated noise reduction flange that can be formed as a monolithic part of the service hole cover. Such an integrated noise reduction flange arrangement can reduce the number of parts forming the rear quarter panel assemblies as compared to, for example, providing a separate vent cover as part of a quarter vent assembly. Use of the noise reduction flange provides a more tortuous path for sound to travel toward the cabin during use. Additional noise reduction features may be provided using the inner quarter panel, which can have projecting regions that protrude into the path of the noise.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle body comprising a quarter panel assembly, the quarter panel assembly comprising:
      an inner quarter panel;
      an outer quarter panel located outboard of the inner quarter panel forming a volume therebetween, the outer quarter panel having a vent opening extending therethrough;
      a quarter vent assembly connected to the outer quarter panel covering the vent opening;
      an exterior fascia covering the quarter vent assembly such that an air gap is provided between the quarter vent assembly and the exterior fascia; and
      a service hole cover located in the volume between the inner quarter panel and the outer quarter panel, the service hole cover comprising a cover body and a noise reduction flange at a bottom of the cover body that extends inboard toward the inner quarter panel at the vent opening.

2. The vehicle of claim 1, wherein the noise reduction flange extends outwardly beyond the cover body in a vehicle lateral direction.

3. The vehicle of claim 1, wherein the noise reduction flange is monolithic with the cover body.

4. The vehicle of claim 1, wherein the noise reduction flange is formed separately from the service hole cover and attached to the cover body.

5. The vehicle of claim 1, wherein the noise reduction flange comprises a connected portion that is connected to the cover body and a free portion that is connected to the connected portion, the connected portion extending outward from the cover body in a vehicle vertical direction and the free portion extending outward from the connected portion in a vehicle lateral direction.

6. The vehicle of claim 5, wherein the free portion is connected to the connected portion at a corner, the corner located behind and inboard the quarter vent assembly.

7. The vehicle of claim 1, wherein the quarter vent assembly comprises an air louver assembly comprising a connector frame, the corner of the noise reduction flange located behind and inboard the connector frame.

8. The vehicle of claim 1, wherein the service hole cover comprises a foam material, a plastic material, or combinations thereof.

9. The vehicle of claim 1, wherein the inner quarter panel comprises a projecting region that projects outboard toward the service hole cover at a location above the noise reduction flange.

10. The vehicle of claim 9, wherein the projecting region projects outward to a distance of about 10 mm or less from the cover body.

11. The vehicle of claim 1, wherein a free end of the noise reduction flange is no more than about 10 mm above the vent opening in a vehicle vertical direction.

12. The vehicle of claim 1, wherein the noise reduction flange has a length that is the same or greater than a length of the vent opening in a vehicle longitudinal direction.

13. A method of reducing noise entering a cabin of a vehicle through a quarter vent assembly, the method comprising:
   placing a service hole cover within a volume between an inner quarter panel and an outer quarter panel, the service hole cover comprising a cover body and a noise reduction flange at a bottom of the cover body that extends inboard toward the inner quarter panel; and
   arranging the service hole cover such that the noise reduction flange is located at the quarter vent assembly.

14. The method of claim 13, wherein the noise reduction flange extends outwardly beyond the cover body in a vehicle lateral direction.

15. The vehicle of claim 13 further comprising forming the noise reduction flange with the cover body.

16. The vehicle of claim 13 further comprising attaching the noise reduction flange to the cover body.

17. The vehicle of claim 13, wherein the noise reduction flange comprises a connected portion that is connected to the cover body and a free portion that is connected to the connected portion, the connected portion extending outward from the cover body in a vehicle vertical direction and the free portion extending outward from the connected portion in a vehicle lateral direction.

18. A service hole cover sized to be located in a volume between an inner quarter panel and an outer quarter panel, the service hole cover comprising:
   a cover body; and
   a noise reduction flange at a bottom of the cover body that extends inboard beyond a thickness of the cover body to a free end.

19. The service hole cover of claim 18, wherein the noise reduction flange has a maximum thickness no greater than half a maximum thickness of the cover body.

20. The service hole cover of claim 18, wherein the noise reduction flange comprises a connected portion that is connected to the cover body and a free portion that is connected to the connected portion, the connected portion extending outward from the cover body and the free portion extending outward from the connected portion at a corner.

\* \* \* \* \*